United States Patent
Eda et al.

(10) Patent No.: US 10,747,458 B2
(45) Date of Patent: Aug. 18, 2020

(54) METHODS AND SYSTEMS FOR IMPROVING EFFICIENCY IN CLOUD-AS-BACKUP TIER

(71) Applicant: INTERNATIONAL BUSINESS MACHINES CORPORATION, Armonk, NY (US)

(72) Inventors: Sasikanth Eda, Vijayawada (IN); Anbazhagan Mani, Bangalore (IN); Sandeep Patil, Pune (IN); Smita J. Raut, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

(21) Appl. No.: 15/819,303

(22) Filed: Nov. 21, 2017

(65) Prior Publication Data

US 2019/0155534 A1     May 23, 2019

(51) Int. Cl.
| | |
|---|---|
| *G06F 3/06* | (2006.01) |
| *H04L 29/08* | (2006.01) |
| *H04L 29/06* | (2006.01) |
| *G06F 16/182* | (2019.01) |

(52) U.S. Cl.
CPC ............ *G06F 3/0641* (2013.01); *G06F 3/067* (2013.01); *G06F 3/0608* (2013.01); *G06F 3/0643* (2013.01); *G06F 16/182* (2019.01); *H04L 63/0428* (2013.01); *H04L 67/1097* (2013.01)

(58) Field of Classification Search
CPC .... G06F 3/0641; G06F 16/182; G06F 3/0608; G06F 3/0643; G06F 3/067; H04L 63/0428; H04L 67/1097
USPC ......................................................... 707/692
See application file for complete search history.

(56) References Cited

U.S. PATENT DOCUMENTS

| | | | |
|---|---|---|---|
| 8,407,190 B2 * | 3/2013 | Prahlad ................. | G06F 3/0649 707/692 |
| 9,665,305 B1 | 5/2017 | Natanzon et al. | |
| 9,679,040 B1 * | 6/2017 | Davis .................. | G06F 16/1844 |
| 2010/0332401 A1 * | 12/2010 | Prahlad ................. | G06F 3/0649 705/80 |
| 2014/0025770 A1 * | 1/2014 | Warfield ........... | G06F 15/17331 709/213 |
| 2016/0350325 A1 * | 12/2016 | Wang .................. | G06F 16/1748 |
| 2017/0083408 A1 | 3/2017 | Vijayan | |
| 2018/0196818 A1 * | 7/2018 | Maybee ................ | G06F 21/602 |
| 2018/0196825 A1 * | 7/2018 | Maybee ................ | G06F 21/602 |
| 2018/0198765 A1 * | 7/2018 | Maybee ................ | G06F 21/602 |

FOREIGN PATENT DOCUMENTS

WO     2017019079 A1     2/2017

\* cited by examiner

*Primary Examiner* — Robert W Beausoliel, Jr.
*Assistant Examiner* — Arthur Ganger
(74) *Attorney, Agent, or Firm* — Griffiths & Seaton PLLC

(57) ABSTRACT

Embodiments for managing data storage by one or more processors are described. An object is created with deduplicated content. A lookup is created, which includes a name of the object and at least one of an address location of the deduplicated content and a byte range of the deduplicated content. The object and the lookup are transferred from a first computing system to a second computing system.

21 Claims, 8 Drawing Sheets

| OBJECT NAME | LINKED DEDUP OBJECT NAME | BYTE RANGE LINKED WITH DEDUP OBJECT |
|---|---|---|
| 20160101 | 80801101 | 0x10101 |
| 20160101 | 80801101 | 0x10103 |
| 20160101 | 80801101 | 0x81000-0x81005 |
| 20160102 | 80801101 | 0x91000 |
| 20160102 | 80801101 | 0x91001 |

FIG. 5

METHODS AND SYSTEMS FOR IMPROVING EFFICIENCY IN CLOUD-AS-BACKUP TIER

BACKGROUND OF THE INVENTION

Field of the Invention

The present invention relates in general to computing systems, and more particularly, to various embodiments for improving efficiency in data storage, such as in deduplication-enabled storage environments.

Description of the Related Art

Current day deduplication-enabled and "cloud-as-backup" tier enabled storage environments often operate by first calculating (or generating) a signature for every chunk (or block) of the incoming data (or file). The signature is then compared to the signatures of existing, or already stored, data chunks. If a signature match is found, the file inode table is updated with the location of the original chunks (i.e., the "master" chunks, blocks, or files). If no signature match is found, the chunk is written to the disk (or other storage medium), and its location is updated in the file inode table.

In such a system or environment, various non-optimized situations may arise, such as when a master file is (e.g., inadvertently) selected for migration to the cloud or when deduplicated files that are linked to the master file are migrated to the cloud while the master remains on the local filesystem (or storage device).

SUMMARY OF THE INVENTION

Various embodiments for managing data storage by one or more processors are described. In one embodiment, by way of example only, a method for managing data storage, again by one or more processors, is provided. An object is created with deduplicated content. A lookup is created, which includes a name of the object and at least one of an address location of the deduplicated content and a byte range of the deduplicated content. The object and the lookup are transferred from a first computing system to a second computing system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 is a deduplication relation table, according to an embodiment of the present invention;

DETAILED DESCRIPTION OF THE DRAWINGS

Figure 1:
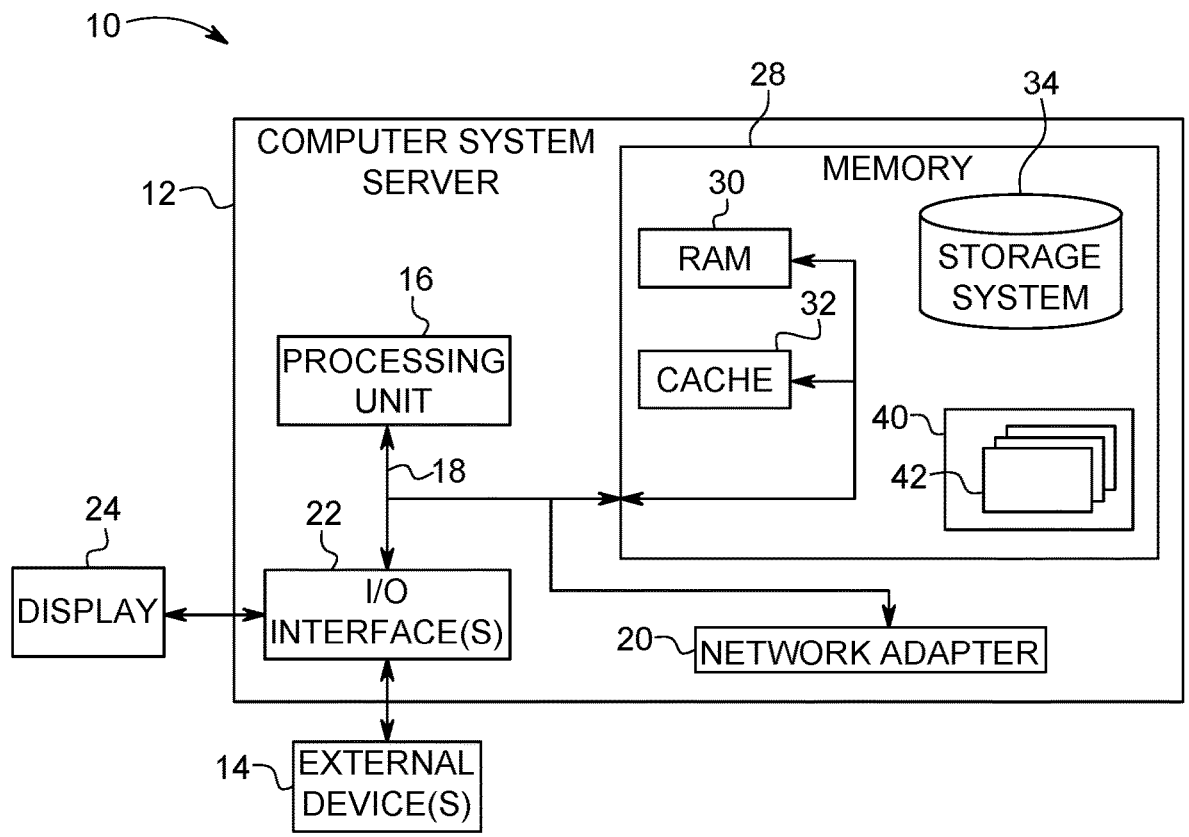
FIG. 1 is a block diagram depicting an exemplary computing node according to an embodiment of the present invention.

As discussed above, in current day deduplication-enabled and "cloud-as-backup" tier enabled storage environments, various non-optimized situations may arise, such as when a master file is (e.g., inadvertently) selected for migration to the cloud or when deduplicated files that are linked to the master file are migrated to the cloud while the master remains on the local filesystem (or storage device). The following discussion describes various features and defines various terms associated with such storage environments, which may be helpful in understanding the embodiments described herein.

Generally speaking, data deduplication may be defined as a technique that helps in eliminating the storage of duplicate copies of data files (or chunks or blocks thereof) in storage systems. This process is often performed by comparing chunks and/or the data associated with multiple files and storing a memory pointer to original data at a duplicated location.

"Cloud-as-tier" (or cloud-as-backup tier) generally is a feature that provides a "cloud as an extended storage tier" option to an on-premises filesystem (or storage system/device). Typically, the cloud technology utilized in such a system is object (or "blob") based (i.e., public, private, or on-premises) that works by using an Information Life Cycle Management (ILM) migrate policy to determine appropriate candidate data for migration to the cloud. File details migrated (or transferred) to the cloud are stored in a database (e.g., on the local filesystem) that stores, for example, the file name, size, MD5, path, cloud Universal Unique Identifier (UUID), and other metadata details. Each file migrated to the cloud leaves a stub on the local filesystem, is stored as two separate objects (i.e., one for data and one for metadata), and creates a container for itself. For example, "file1.txt" on the local filesystem may be stored as {container name: 2020201010; object-1: 2020201010.data; object-2: 2020201010.meta} on cloud. When a read/write event is performed on the stubs, using, for example, the IBM Light Weight Events (LWE) policy or notify, these events are captured, and a recall script is triggered which reconstructs the file based on data and metadata objects stored in the cloud.

Object GET read-range (Read multi-byte range) is an application program interface (API) supported by most of the object storage systems utilizing the representational state transfer (REST or RESTful) API. GET allows the end user to include a range header in object download (GET) request by which only a portion of an object is downloaded. Object PUT update-range (Update multi-byte range) is an API supported by most of the object storage vendors (i.e., utilizing the REST API), using which the end user can include a range header in object update (PUT) request by which only a portion of an object is updated.

In such an environment, deduplication is often performed by first calculating (or generating) a signature for every chunk (or block) of the incoming data (or file). The signature is then compared to the signatures of existing, or already stored, data chunks. If a signature match is found, the file inode table is updated with the location of the original chunks (i.e., the "master" chunks, blocks, or files). If no signature match is found, the chunk is written to the disk (or other storage medium), and its location is updated in the file inode table. Using such a method, various non-optimized situations may arise, examples of which are described below.

Consider a scenario in which the data chunks of 100 files are deduplicated to data chunks corresponding to a single master file. Due to an administrator migration policy (e.g., which automatically selects files that need to be sent to the cloud based on business rules), the master file has been selected for migration to the cloud. With current systems, the master file (along with all its corresponding chunks) is migrated to the cloud, leaving a stub on filesystem, which breaks the deduplication relationship and a clone of deduplication blocks is created before migration is triggered. This results in performance degradation of the 100 deduplicated files, as the Input/Output (I/O) cannot be served until the cloning operation is completed, and the migration performance is impacted, as it cannot be migrated until the cloning of the deduplicated blocks is completed.

Consider another scenario in which the deduplicated files that are linked to the master file are selected for tiering to the cloud. With the current systems, the deduplicated relationship with the master is broken, and a complete (or full) copy of the deduplicated file(s) are tiered to the cloud. This impacts migration performance, as the full copy of the deduplicated files must be prepared before migration is triggered, and creates a non-optimized scenario in terms of storage capacity, as the full copy of content exists at both on-premises and cloud data center.

As another example, consider a scenario in which the deduplicated file(s) that are linked to the master file are selected for tiering to the cloud and encrypted before migration. Encryption and deduplication are, in a sense, opposite operations. That is, deduplication essentially involves finding patterns in data and encryption essentially involves removing patterns in data. As a result, even if deduplication is applied at the cloud tier, poor deduplication ratio is achieved, increased network resources are consumed, and the storage foot print (or space) is not minimized.

Generally speaking, one of the reasons for the above-mentioned problems is associated with a lack of a method, system, and/or framework that enables deduplication transparency across the on-premises (or local) filesystem (or first computing system) and the cloud (or second computing system), which may assist in the optimization of storage space and data movement.

To address these needs, some embodiments described herein provide methods and systems for managing data storage that optimize storage capacity and movement between (at least) two computing systems (or storage systems), such as a local filesystem and a cloud-as-tier (e.g., to/from cloud-as-tier, backup/restore files stored on an on-premises filesystem to/from public/private cloud storage), in a deduplication-enabled storage environment by leveraging, for example, the multi-range object GET and PUT APIs. Also provided are methods/systems to maintain the deduplication relationship between encrypted objects migrated to the cloud and a provision to maintain the deduplication relationship across an on-premises filesystem (or first computing system) and cloud storage system (or second computing system).

In particular, in some embodiments, a method for managing data storage by one or more processors is provided. An object is created with deduplicated content. A lookup is created, which includes a name of the object and at least one of an address location of the deduplicated content and a byte range of the deduplicated content. The object and the lookup are transferred from a first computing system to a second computing system.

The method may also include storing the lookup as a second object. The storing of the lookup as the second object may include storing the second object in the same namespace as the (first) object. The method may also include encrypting the object and the second object. The encrypting of the (first) object and the second object may occur (or be performed) before the transferring of the object and the lookup from the first computing system to the second computing system.

The creating of the object may include creating a copy-on-write (COW) image of the deduplicated content. The transferring of the object and the lookup from the first computing system to the second computing system may be performed utilizing a representational state transfer (REST) application program interface (API) (e.g., GET API and PUT API).

Although portions of the description provided herein may refer to computing systems (and/or components thereof) such as, for example, a "local filesystem" and "cloud storage system," it should be understood that the methods and systems of the present embodiments may be applied to any computing environments in which multiple computing systems (and/or storage systems/devices) are in operable communication and data stored on one computing system may be transferred (e.g., backed up) on another computing system within the environment. For example, rather than a local filesystem and cloud storage system, the methods and systems described herein may also be applied to scenarios as simple as a desktop PC and an external hard drive connected via, for example, a USB cable.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, computing devices, such as personal computer systems, hand-held or laptop devices, and network PCs/servers, and/or various other devices. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
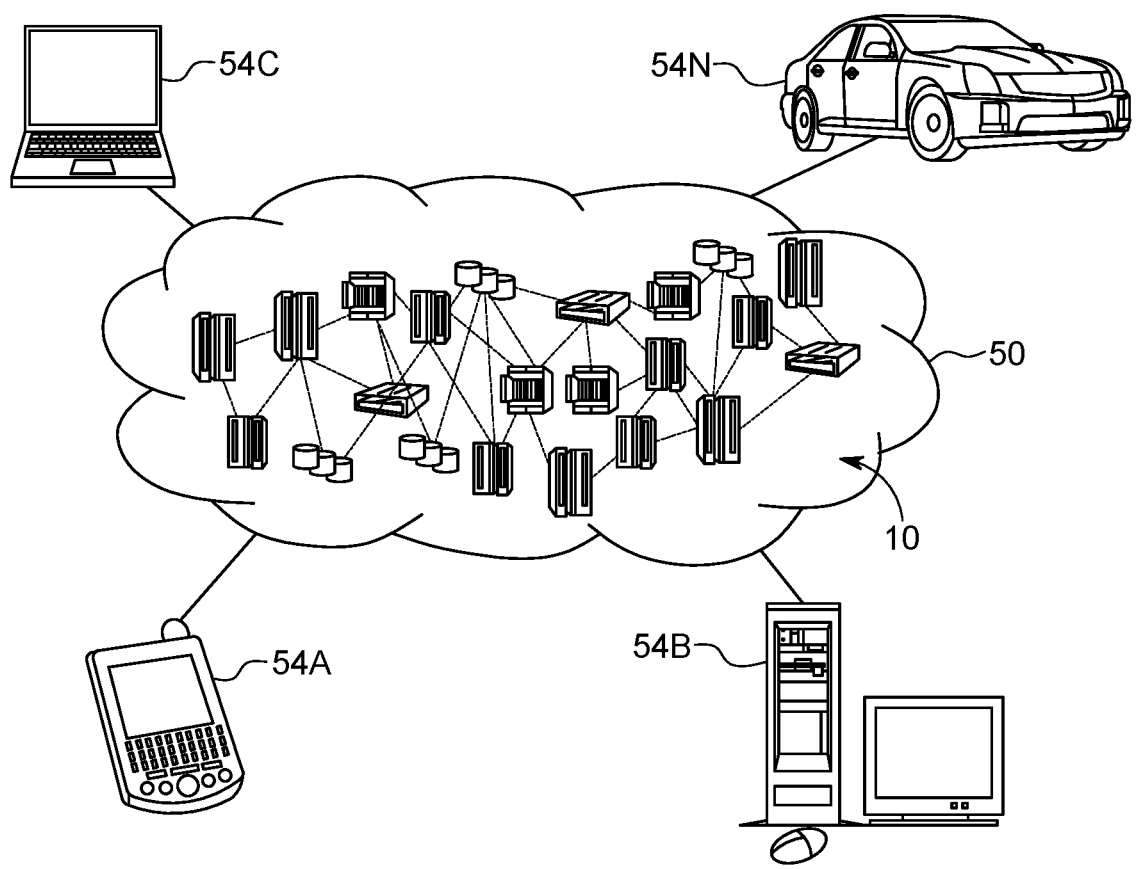
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
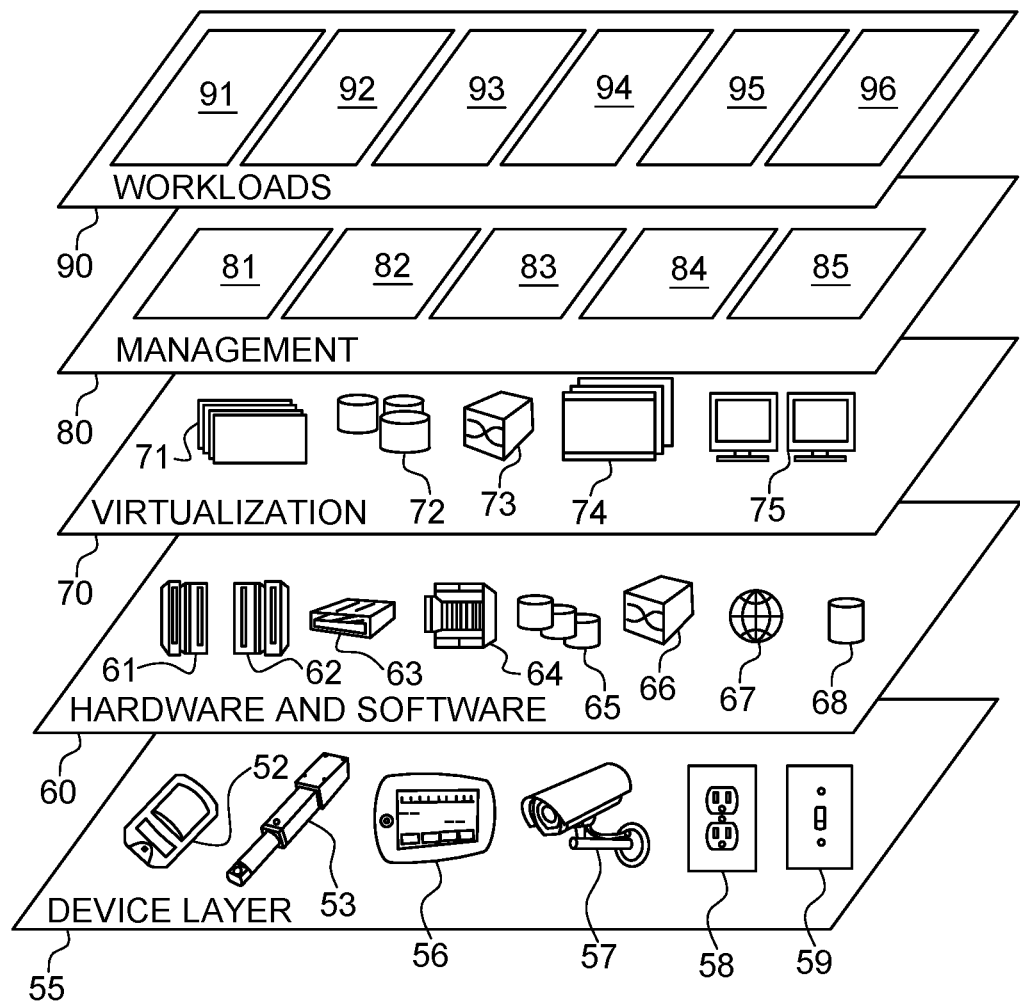
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing data storage and/or transfers as described herein. One of ordinary skill in the art will appreciate that the workloads and functions 96 for managing data storage and/or transfers may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing data storage (and/or transfers). Some embodiments described herein provide methods and systems for managing data storage that optimize storage capacity and movement between (at least) two computing systems (or storage systems), such as a local filesystem and a cloud-as-tier (e.g., to/from cloud-as-tier, backup/restore files stored on an on-premises filesystem to/from public/private cloud storage), in a deduplication enabled storage environment by leveraging the multi-range object GET and PUT APIs. Also provided is a method/system to maintain the deduplication relationship between encrypted objects migrated to the cloud and a provision to maintain the deduplication relationship across an on-premises filesystem (or first computing system) and cloud storage system (or second computing system).

In particular, in some embodiments, a method for managing data storage by one or more processors is provided. An object is created with deduplicated content. A lookup is created, which includes a name of the object and at least one of an address location of the deduplicated content and a byte range of the deduplicated content. The object and the lookup are transferred from a first computing system to a second computing system.

The method may also include storing the lookup as a second object. The storing of the lookup as the second object may include storing the second object in the same namespace as the (first) object. The method may also include encrypting the object and the second object. The encrypting of the (first) object and the second object may occur (or be performed) before the transferring of the object and the lookup from the first computing system to the second computing system.

The creating of the object may include creating a copy-on-write image of the deduplicated content. The transferring of the object and the lookup from the first computing system to the second computing system may be performed utilizing a representational state transfer (REST) application program interface (API) (e.g., GET and PUT APIs).

The method and systems described herein provide the following features and flexibility to the traditional cloud-as-tier (TCT) application. In some embodiments, a user (e.g., an administrator) may select which files (e.g., the master and/or at least some of the deduplicated files) are migrated to the cloud (e.g., via a system level setting or configuration). For example, the master and all deduplicated files may be migrated to the cloud (i.e., no blocks are left on the local filesystem), only the master file may be migrated to the cloud (i.e., leaving the deduplicated files on the local filesystem), only the deduplicated files (i.e., all of the deduplicated files) are migrated to the cloud (i.e., leaving the master file on the local filesystem), or only some of the deduplicated files are migrated to the cloud (i.e., leaving the master file on the local filesystem).

In some embodiments (e.g., if the opted policy calls for the master file and all of the deduplicated files to be migrated to the cloud), an object is created (or generated) with deduplicated (i.e., common/shared) blocks of data along with objects corresponding to master and deduplicated files. That is, a common (or shared) deduplicated object is created along with partial content deduplicated objects for the master and deduplicated files. A deduplication relation (or relationship) table (or lookup) is created along with the deduplicated object. The deduplication relation table contains, for example, the deduplicated object(s) name and the associated deduplicated content address location or byte ranges and is stored as an object in the same namespace as the master object. The objects are then encrypted and migrated to the cloud. The master object may be directly accessed utilizing, for example, the REST API during restore operations. However, when a deduplicated object is accessed, the full object is served based on the partial current deduplicated object, deduplicated common object, and the deduplication relation table. In contrast, in conventional approaches, the deduplication relationship is broken, resulting in full content for every deduplicated file being stored.

In some embodiments (e.g., if the opted policy calls for only the master file being migrated to the cloud), COW blocks of deduplicated data are created, and a different master is elected (or chosen) from the deduplicated files. The selection of the master file may be based on the least accessed file. A deduplication relation table (or lookup) is created along with the deduplicated object. The deduplication relation table contains, for example, the deduplicated content address location(s) or byte ranges vs. blank object names and is stored as an object in the same namespace as the master object. The objects are then encrypted and migrated to the cloud. The blank object names may be populated when the deduplicated files are migrated to the cloud. Again, in contrast, in conventional approaches, the deduplication relationship is broken, resulting in full content for every deduplicated file being stored.

In some embodiments (e.g., if the opted policy calls for all of the deduplicated files being migrated to the cloud), one COW (copy-on-write) image of the deduplicated data blocks is created and uploaded as a single object to the cloud. A deduplication relation table is created along with the deduplicated object. The deduplication relation table contains, for example, the deduplicated object name and the associated deduplicated content address location or byte ranges and is stored as an object in the same namespace as the master object. The objects are encrypted and migrated to the cloud. When a deduplicated object is accessed, the full object is served based on the partial current deduplicated object, deduplicated common object, and deduplication relation table. Again, in contrast, in conventional approaches, the deduplication relationship is broken, resulting in full content for every deduplicated file being stored.

In some embodiments (e.g., if the opted policy selects only some of the deduplicated files being migrated to the cloud), a ratio of the deduplicated files residing on the local filesystem to the deduplicated files selected for migration to the cloud is calculated. If the number (or percentage) of deduplicated files to be migrated to the cloud are beyond a certain threshold (e.g., a predetermined threshold that may be set by an administrator), one COW image of the deduplicated data blocks is created and uploaded as a single object to the cloud. However, if the number of deduplicated files to be migrated to the cloud is below the threshold (and/or less than the number of deduplicated files (as well as immutable) residing on the local filesystem), only the partial and/or different content of each deduplicated file is migrated to the cloud. A deduplication relation table is created. The deduplication relation table includes, for example, the deduplicated object name vs. the deduplicated content address location or block addresses of filesystem and is stored in the same namespace as the deduplicated object(s). Yet again, in contrast, in conventional approaches, the deduplication relationship is broken, resulting in full content for every deduplicated file being stored.

Figure 4:
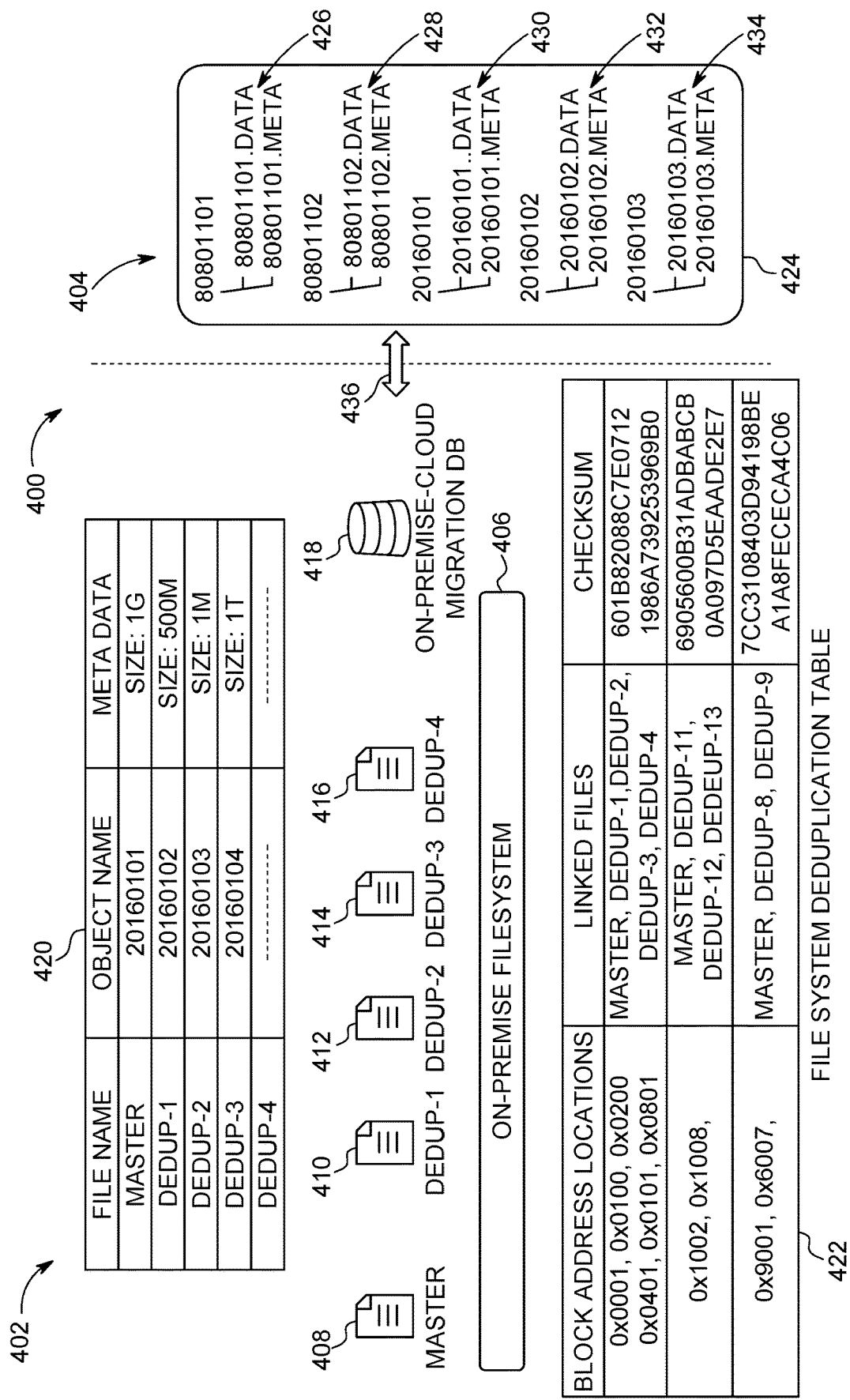
FIG. 4 is a simplified schematic/block diagram of an exemplary computing network according to an embodiment of the present invention.

Referring now to FIG. 4, a simplified schematic/block diagram of an exemplary computing environment (or network) 400 is illustrated, in which various aspects of functionality in accordance with some embodiments described herein are shown. The computing environment 400 includes a first computing system 402 and a second computing system 404. In some embodiments, the first computing system 402 corresponds to a local computing system (or device), and the second computing system 404 corresponds to a remote computing system (e.g., located in a locale different than that of the first computing system 402, etc.). For example, the first computing system 402 may be implemented within a desktop PC, a smartphone, a tablet, etc., and the second computing system 404 may be implemented in a remote computing system, such as a cloud storage system, as is commonly understood. It should be understood that the various components of the first computing system 402 and the second computing system 404 shown in FIG. 4 may only represent a portion of the respective computing systems, as in some embodiments, additional components may be included. Further, each of the components shown may be understood to simply represent various aspects of functionality as described herein and may be implemented in the various types of hardware (e.g., processors, memories, etc.) described above.

Still referring to FIG. 4, in the depicted embodiment, the first computing system 402 includes a local filesystem (or first storage device/memory/system) 406 with various items stored thereon: a master file (or stub thereof) 408, first, second, third, and fourth deduplicated files 410-416, an on-premises-cloud migration database 418, file details 420, and a filesystem deduplication table 422. It should be understood that additional files/content (e.g., additional deduplicated files) that are not shown in FIG. 4 may be stored on the filesystem 406.

As shown in FIG. 4, the second computing system 404 includes a remote storage system (e.g., including a hard disk(s) and/or tape drive(s)) with multiple objects 426-434 that have been migrated from the first computing system 402 via signal (or network traffic) 436. In particular, the objects include a deduplicated content object 426, a deduplication relation table object 428, a partial content object of the master 430, a partial content object for the first deduplicated file 432, and a partial content object for the second deduplicated file 434. Although not shown, it should be noted that additional partial content objects may also be stored on the remote storage system 404 (e.g., corresponding to the third and fourth deduplicated files 414 and 416).

FIG. 5 illustrates an exemplary deduplication relation table 500 according to some embodiments. In particular, the deduplication relation table 500 may correspond to the deduplication relation table object 428 shown in FIG. 4. As shown in FIG. 5, the deduplication relation table 500 includes object names, the names of linked deduplicated objects, and byte ranges of (or linked with) the deduplicated objects. It should be noted that some of the details shown in the deduplication relation table 500 in FIG. 5 correspond to the details included in the file details 420 and filesystem deduplication table 422 in FIG. 4.

Figure 6:
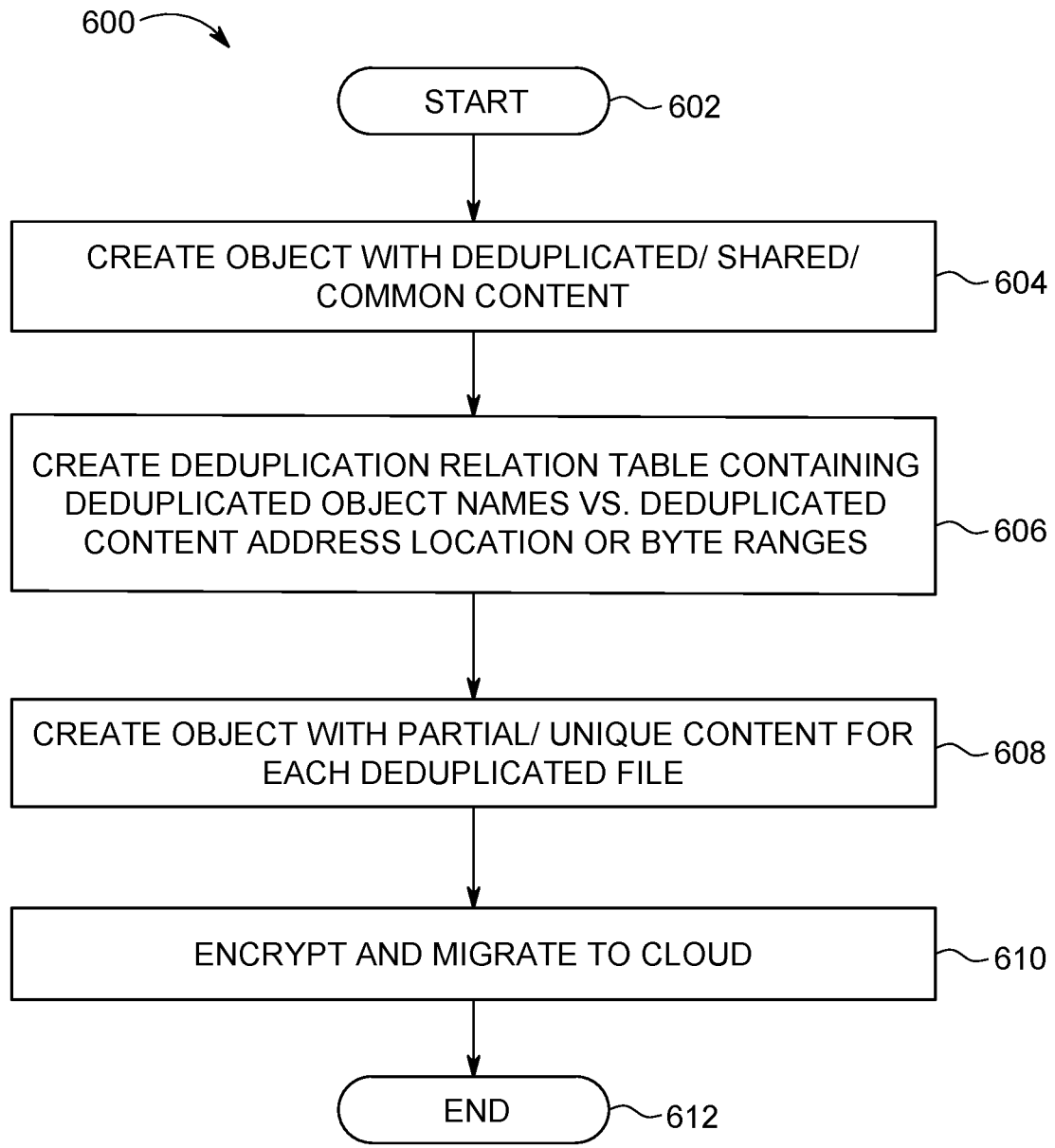
FIG. 6 is a flowchart diagram of an exemplary method for managing data storage, according to an embodiment of the present invention.

FIG. 6 illustrates a flowchart diagram of an exemplary method 600 for managing data storage, in accordance with various aspects of the present invention. In particular, method 600 includes various steps that may be utilized in transferring data from, for example, a local filesystem to the cloud in accordance with some of the embodiments described herein. Method 600 begins (step 602) with, for example, the receiving of a selected policy with respect to which files/objects are to be migrated to the cloud (or more generally, transferred between computing systems that are in operable communication, such as via the internet, wi-fi, etc.). In the embodiment shown in FIG. 6, the selected policy may call for both the master file and all deduplicated files to be migrated to the cloud.

An object is created with deduplicated/shared/common content (step 604). A deduplication relation table is created (step 606). The deduplication relation table includes, for example, deduplicated object names and associated (i.e., "vs.") address location(s) of the deduplicated content or byte ranges. The deduplication relation table may be stored as an object. Additional objects are created with partial/unique content for each of the deduplicated files (step 608). All of the appropriate/selected objects are then encrypted and migrated to the cloud (step 610). Method 600 ends (step 612), for example, after all of the appropriate/selected objects have been migrated to the cloud.

Figure 7:
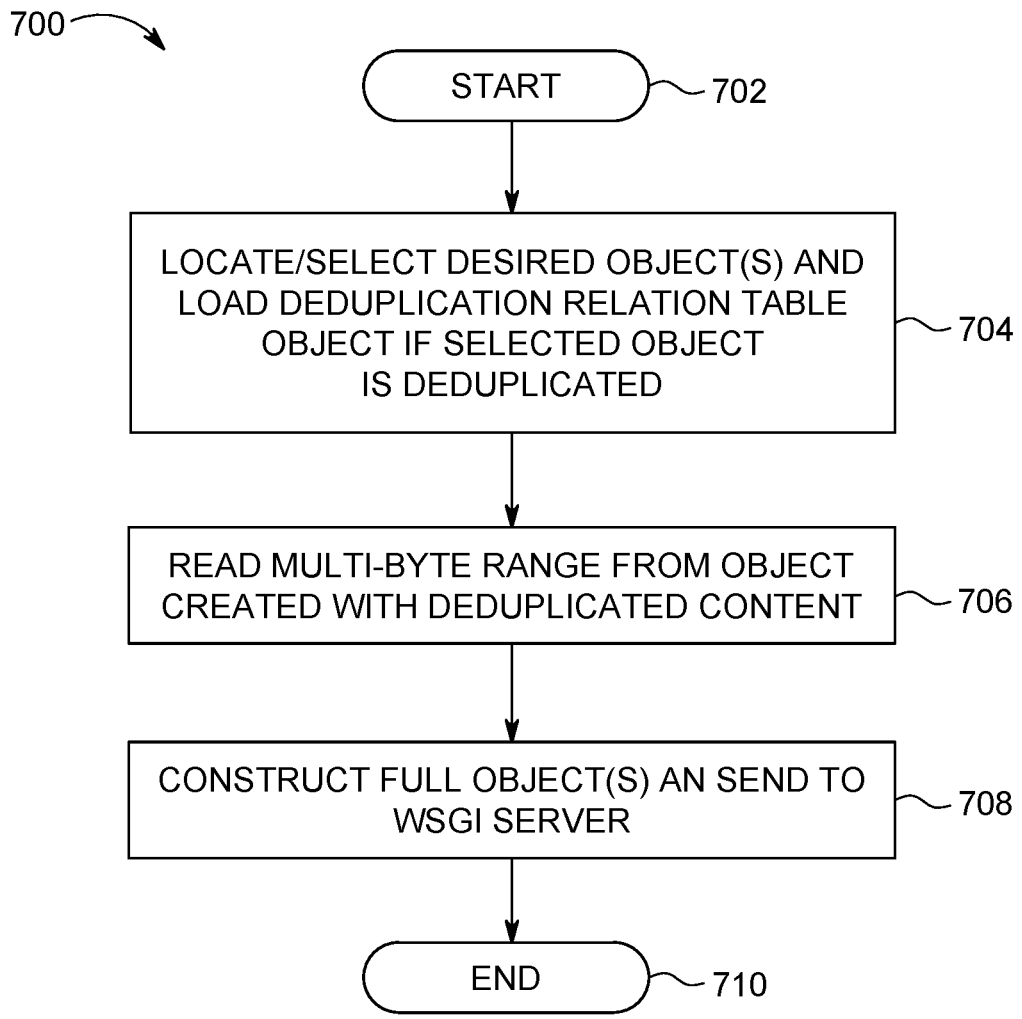
FIG. 7 is a flowchart diagram of an exemplary method for managing data storage, according to an embodiment of the present invention.

FIG. 7 illustrates a flowchart diagram of an exemplary method 700 for managing data storage, in accordance with various aspects of the present invention. In particular, method 700 includes various steps that may be utilized in retrieving, downloading, or restoring data stored on the cloud to a local filesystem in accordance with some of the embodiments described herein. Method 700 begins (step 702) with, for example, the receiving or detecting of an attempt by a user to retrieve, download, or restore an object (created with deduplicated content) from the cloud to a local filesystem (or more generally, transferred between computing systems that are in operable communication, such as via the internet, etc.).

The desired object is located/selected, and if the object is marked as including (or being created with) deduplicated content, the object including (and/or that was created from) a deduplication relation table is (also) loaded (step 704). A multi-byte range is read from the object (step 706), and the appropriate objects are retrieved/loaded (e.g., using the deduplication relation table). The full/complete object(s) is constructed and sent to, for example, a Web Server Gateway Interface (WSGI) server (step 708). Method 700 ends (step 710) with, for example, the object being retrieved, downloaded, or restored to the local filesystem.

Figure 8:
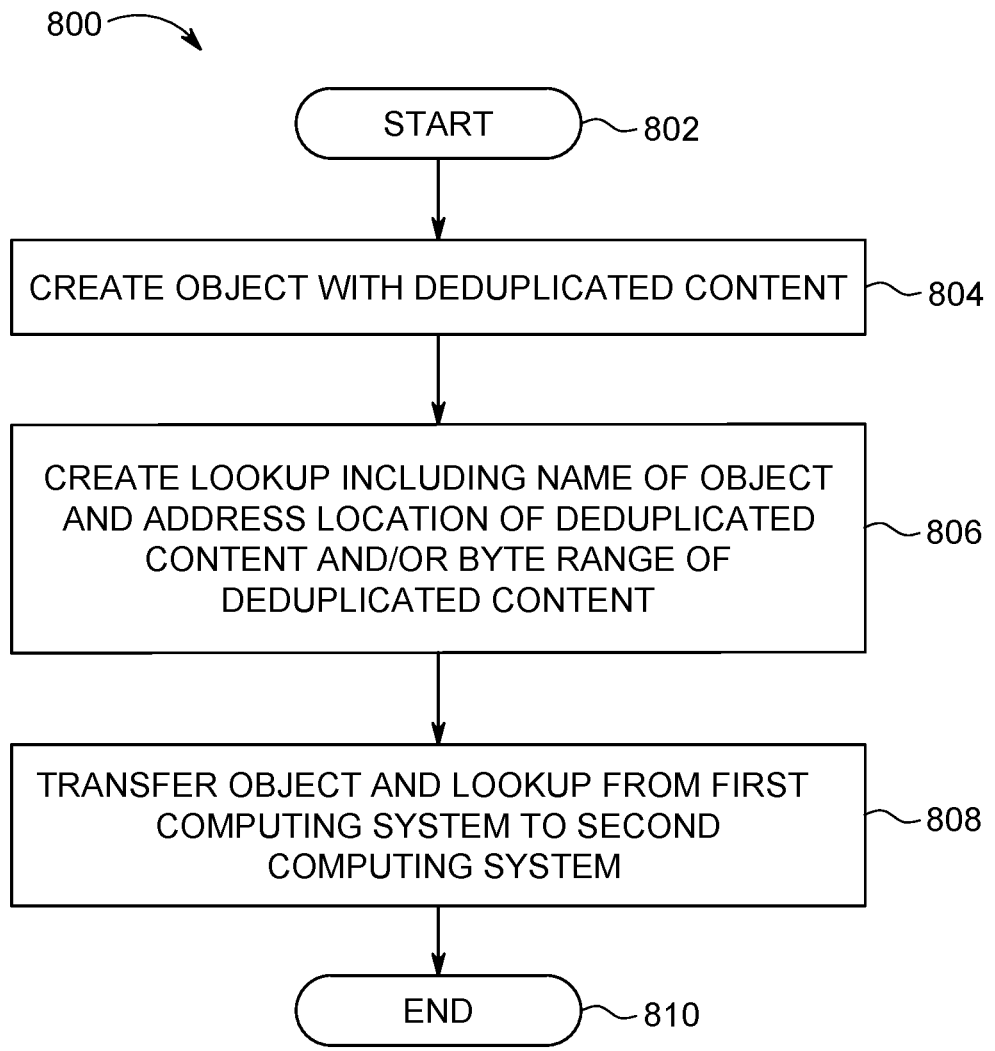
FIG. 8 is a flowchart diagram depicting an exemplary simplified method for managing data storage, in which various aspects of the present invention may be implemented.

Turning to FIG. 8, a flowchart diagram of an exemplary, simplified method 800 for managing data storage, in accordance with various aspects of the present invention, is provided. Method 800 begins (step 802) with, for example, a first computing system (e.g., a local filesystem) and a second computing system (e.g., a cloud storage system) being placed in operable communication with each other (e.g., via the interne, wi-fi, etc.) and data being stored on at least one of the two systems (and/or on a memory device therein) and a request to transfer deduplicated content from the first computing system to the second computing system (e.g., to migrate the deduplicated content from the local filesystem to the cloud) being made.

An object is created with the deduplicated content (step 804). The creating of the object may include creating a COW image of the deduplicated content. A lookup (or deduplication relation table) is created (step 806). The lookup includes a name of the object and an address location of the deduplicated content and/or a byte range of the deduplicated content. The lookup may be stored as a (second) object in, for example, the same namespace as the (first) object. The objects may be encrypted.

The object and the lookup (or the second object) are transferred from the first computing system to the second computing system (or migrated to the cloud) (step 808). The transferring of the object and the lookup from the first computing system to the second computing system may be performed utilizing a representational state transfer (REST) application program interface (API).

Method 800 ends (step 810) with, for example, the objects being migrated to the cloud. Method 800 may then return to step 802 so that additional deduplicated content may be transferred to the second computing system, as described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing data storage, comprising:
    creating an object with deduplicated content, wherein the deduplicated content is co-dependent between a plurality of deduplicated files and a master file;
    creating a plurality of partial content objects respectively corresponding to the master file and each of the plurality of deduplicated files;
    creating a lookup comprising a deduplication relationship table indicating relationships between the co-dependent deduplicated files and the master file associated with the object of deduplicated content, wherein the lookup comprises a name of the object and at least one of an address location of the deduplicated content and a byte range of the deduplicated content;
    transferring at least the object and the lookup from a first computing system to a second computing system; and
    in response to the second computing system receiving a request to retrieve the object by the first computing system, locating and loading the plurality of partial content objects according to the lookup, wherein the deduplicated content of the object and the plurality of partial content objects is assembled into a complete object subsequently returned to the first computing system.

2. The method of claim 1, further comprising storing the lookup as a second object.

3. The method of claim 2, wherein the storing of the lookup as the second object comprises storing the second object in the same namespace as the object.

4. The method of claim 2, further comprising encrypting the object and the second object.

5. The method of claim 4, wherein the encrypting of the object and the second object occurs before the transferring of the object and the lookup from the first computing system to the second computing system.

6. The method of claim 1, wherein the creating of the object comprises creating a copy-on-write (COW) image of the deduplicated content.

7. The method of claim 1, wherein transferring the object and the lookup from the first computing system to the second computing system is performed through a representational state transfer (REST) application program interface (API).

8. A system for managing data storage, comprising:
    at least one processor that
        creates an object with deduplicated content, wherein the deduplicated content is co-dependent between a plurality of deduplicated files and a master file;
        creates a plurality of partial content objects respectively corresponding to the master file and each of the plurality of deduplicated files;
        creates a lookup comprising a deduplication relationship table indicating relationships between the co-dependent deduplicated files and the master file associated with the object of deduplicated content, wherein the lookup comprises a name of the object and at least one of an address location of the deduplicated content and a byte range of the deduplicated content;
        transfers at least the object and the lookup from a first computing system to a second computing system; and
        in response to the second computing system receiving a request to retrieve the object by the first computing system, locates and loads the plurality of partial content objects according to the lookup, wherein the deduplicated content of the object and the plurality of partial content objects is assembled into a complete object subsequently returned to the first computing system.

9. The system of claim 8, wherein the at least one processor further stores the lookup as a second object.

10. The system of claim 9, wherein the storing of the lookup as the second object comprises storing the second object in the same namespace as the object.

11. The system of claim 9, wherein the at least one processor further encrypts the object and the second object.

12. The system of claim 11, wherein the encrypting of the object and the second object occurs before the transferring of the object and the lookup from the first computing system to the second computing system.

13. The system of claim 8, wherein the creating of the object comprises creating a copy-on-write (COW) image of the deduplicated content.

14. The system of claim 8, wherein transferring the object and the lookup from the first computing system to the second computing system is performed through a representational state transfer (REST) application program interface (API).

15. A computer program product for managing data storage by one or more processors, the computer program product comprising a non-transitory computer-readable storage medium having computer-readable program code portions stored therein, the computer-readable program code portions comprising:

an executable portion that creates an object with deduplicated content, wherein the deduplicated content is co-dependent between a plurality of deduplicated files and a master file;

an executable portion that creates a plurality of partial content objects respectively corresponding to the master file and each of the plurality of deduplicated files;

an executable portion that creates a lookup comprising a deduplication relationship table indicating relationships between the co-dependent deduplicated files and the master file associated with the object of deduplicated content, wherein the lookup comprises a name of the object and at least one of an address location of the deduplicated content and a byte range of the deduplicated content;

an executable portion that transfers at least the object and the lookup from a first computing system to a second computing system; and an executable portion that, in response to the second computing system receiving a request to retrieve the object by the first computing system, locates and loads the plurality of partial content objects according to the lookup, wherein the deduplicated content of the object and the plurality of partial content objects is assembled into a complete object subsequently returned to the first computing system.

16. The computer program product of claim 15, wherein the computer-readable program code portions further include an executable portion that stores the lookup as a second object.

17. The computer program product of claim 16, wherein the storing of the lookup as the second object comprises storing the second object in the same namespace as the object.

18. The computer program product of claim 16, wherein the computer-readable program code portions further include an executable portion that encrypts the object and the second object.

19. The computer program product of claim 18, wherein the encrypting of the object and the second object occurs before the transferring of the object and the lookup from the first computing system to the second computing system.

20. The computer program product of claim 15, wherein the creating of the object comprises creating a copy-on-write (COW) image of the deduplicated content.

21. The computer program product of claim 15, wherein transferring the object and the lookup from the first computing system to the second computing system is performed through a representational state transfer (REST) application program interface (API).

* * * * *